United States Patent [19]

White

[11] 4,152,553
[45] May 1, 1979

[54] PROTECTIVE HELMET WITH VOICE COMMUNICATION SYSTEM

[75] Inventor: Maynard E. White, P.O. Box 1446, Elkhart, Ind. 46515

[73] Assignee: Maynard E. White, Elkhart, Ind.

[21] Appl. No.: 893,672

[22] Filed: Apr. 5, 1978

[51] Int. Cl.² ............................................ H04M 1/05
[52] U.S. Cl. ........................... 179/156 R; 179/181 W
[58] Field of Search ............ 179/156 R; 325/16, 111, 325/118, 181 W

[56] References Cited

U.S. PATENT DOCUMENTS

| 2,942,072 | 6/1960 | Cunningham | 179/156 R |
| 3,845,389 | 10/1974 | Phillips | 325/16 |
| 3,983,483 | 9/1976 | Pando | 325/16 |

FOREIGN PATENT DOCUMENTS

| 740988 | 8/1966 | Canada | 325/16 |
| 936921 | 11/1973 | Canada | 325/16 |
| 2231164 | 12/1974 | France | 325/16 |

*Primary Examiner*—William C. Cooper
*Attorney, Agent, or Firm*—Wagner & Aubel

[57] ABSTRACT

An improved protective helmet of the type including a two-way voice controlled communication system having electronic transmitting and receiving circuitry. When incoming signals are received by the voice communication system, a transducer vibrates a rigid portion of the helmet, causing the helmet to act as a diaphragm to produce intelligible audible sounds. The electronic circuitry of the voice communication system is mounted in a resilient carrier for protection against damage from impact and shock to the helmet. Alternatively, the electronic circuitry may be supported on and protected by the conventional cushion lining of a protective helmet.

6 Claims, 7 Drawing Figures

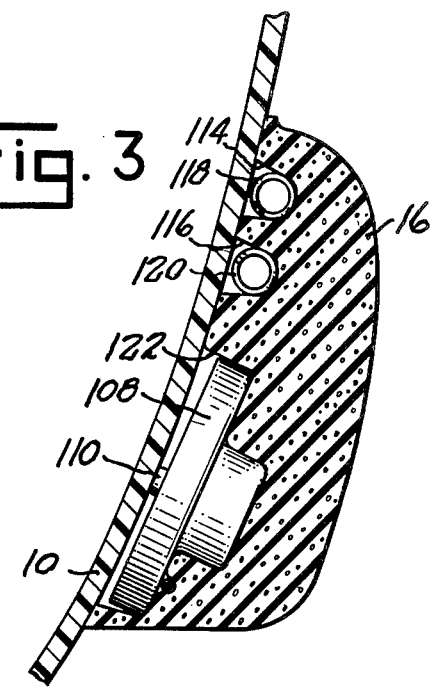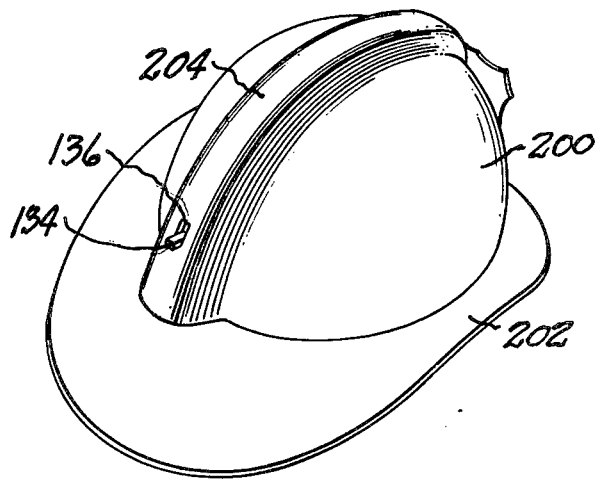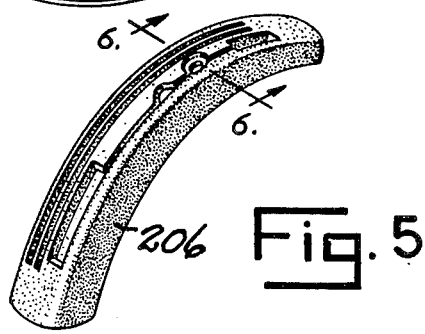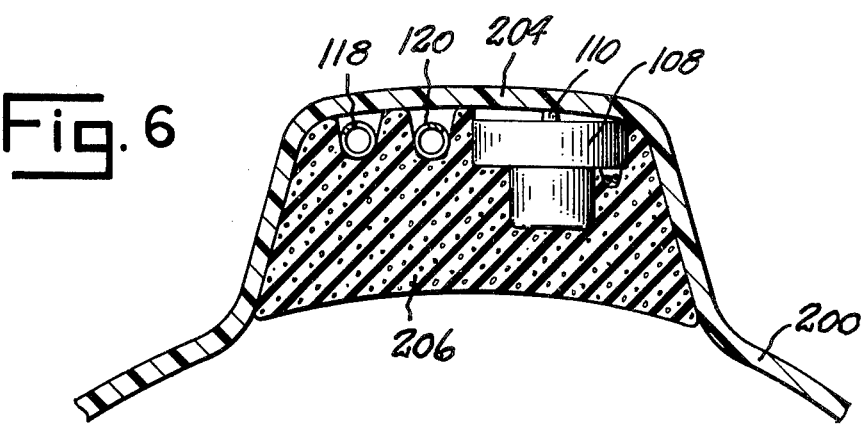

PROTECTIVE HELMET WITH VOICE COMMUNICATION SYSTEM

CROSS-REFERENCE TO RELATED APPLICATIONS

This invention relates to an improved protective helmet which may utilize the electronic circuitry of the type disclosed in the copending application of Maynard E. White, Lindsey E. Waldorf and Kenneth E. Monroe, for Two-Way Voice Controlled Communication System, Ser. No. 720,652, filed Sept. 7, 1976, assigned to Maynard E. White, and furthermore this application discloses subject matter common to the copending application of Maynard E. White, for Helmet with Two-Way Voice Controlled Communication System, Ser. No. 720,651, filed Sept. 7, 1976.

BACKGROUND OF THE INVENTION

Protective helmets equipped with two-way voice controlled communication systems are, of course, well knonw. However, each of the helmets with voice communication systems heretofore known suffers various shortcomings as will be more fully described.

A first category of such protective helmets are exemplified by the U.S. Pat. No. to Vail, 3,559,209, which is directed to a space suit having a communication system within the space suit helmet. Typically the electronic system in the helmet is connected from the space suit by an umbilical cord to the space ship and is thus not a complete and self-contained system.

Another type of protective helmet with a two-way communication system is disclosed in each of Canadian Pat. No. 740,988, Canadian Pat. No. 936,921 and French Pat. No. 2,261,682. Each of the devices disclosed in those patents have an external antenna, are not protected from shock and provide ear phones which may completely cover the ear of the helmet wearer.

An analysis of the prior art devices disclose the following shortcomings. First is the provision of speakers which completely cover the ears. This, of course, precludes or makes it difficult for the user of the helmet to engage in conversations with those close by because the ear phones, which cover the ear, effectively muffle direct communication. By direct communication, of course, we are referring to communication other than through the communication system itself.

Second, none of the systems heretofore known provide a proper cushioning for the electronics itself. For example, in the aforementioned French Patent, the electronics are completely mounted exteriorly of the helmet with the deliberate intent that in the event of impact the system is knocked free of the helmet. In the aforementioned Canadian patents, the electronics unit is secured to the protective helmet itself and is thus easily damaged from impact to the helmet.

The present invention eliminates these aforementioned problems by a novel approach to the entire concept of protective helmets having voice controlled communication systems associated therewith.

SUMMARY OF THE INVENTION

The present invention is directed to an improved protective helmet having a voice communication system which eliminates the shortcomings of the prior art by providing suitable mounting and cushioning for the electronic circuitry of the system and which eliminates the need for ear phones.

More specifically, a first embodiment of this invention includes a transducer means responsive to the incoming electrical signal for causing at least a portion of the helmet to vibrate. The vibrating helmet functions as a diaphragm of a speaker to thereby produce audible sound. Notwithstanding the audible sounds occasioned by the vibrating helmet, the wearer of the helmet may still participate in direct communications with persons who are not equipped with a voice communication system.

Furthermorre, the present invention includes, in a second embodiment, a resilient carrier for supporting and cushioning the electronic circuitry of the present system. This resilient carrier may be mounted external to the helmet or internally of the helmet and, when mounted internally of the helmet, the resilient member further serves as a cushioning member to protect the wearer of the helmet.

Finally, in a third embodiment, the conventional protective liner of the helmet may serve as the resilient member to support and protect the electronic circuitry of the present invention.

The protective helmet of the present invention further includes a voice communication system which is normally in a receive mode and automatically switches to a transmit mode in response to the voice of the wearer.

BRIEF DESCRIPTION OF THE DRAWINGS

The various objects and benefits of the present invention as heretofore explained, together with other objects and advantages which may be attained by its use, will become apparent from reading the following detailed description taken in conjunction with the drawings.

In the drawings, wherein like reference numeral identify corresponding parts:

FIG. 3 is a transverse sectional view of the resilient member of FIG. 2 and of the helmet associated therewith, as seen in the plane of arrows 3—3 of FIG. 2 and illustrating the transducer means for causing the helmet to vibrate;

FIG. 4 is a perspective view illustrating one type of helmet wherein the electronics may be mounted interiorly of the helmet;

FIG. 5 is a perspective view of an optional resilient member for the type of helmet illustrated in FIG. 4;

FIG. 6 is a transverse sectional view of the resilient member of FIG. 5, along with a portion of the helmet, as seen in the plane of arrows 6—6 of FIG. 5 and illustrating the transducer means in contact with the helmet to cause vibration thereof.

DETAILED DESCRIPTION OF THE INVENTION

With reference to the drawings, a protective helmet 10 of the type to be supported by and covering the top of the head of the wearer is illustrated in a configuration commonly worn by police, motorcyclists, snowmobilers, sky divers and others. The particular shape of the protective helmet may vary, since other configurations of protective helmets such as the type worn by fire fighters, construction workers, factory workers and the like are also well known. Hence the particular configuration of the protective helmet 10 of FIG. 1 is for illustrative purposes only and is not a limitation on the configuration of the helmet which can be utilized according to the principles of the present invention.

The protective helmet is provided with a resilient or cushioning lining 12 of a compressible material. Foamed urethane is one such material conventionally utilized for this purpose. The protective lining 12 may be permanently bonded to the interior of the rigid plastic helmet body or it may be force fit therein, both techniques being conventional. The protective lining 12 may include recesses 13 to comfortably accommodate the ear of the wearer, also as is conventional and finally the protective lining 12 may also extend along the edges of the helmet 10 to prevent injury from the rigid edges of the helmet body. The protective helmet 10 may include a chin strap 14 or similar securing means.

Figure 1:
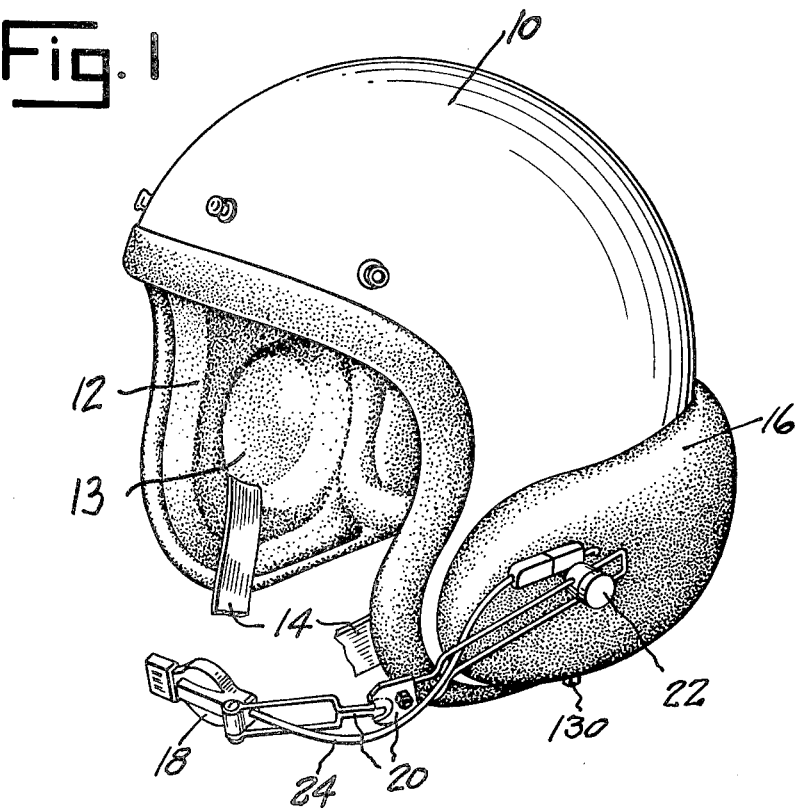
FIG. 1 is a perspective view of a protective helmet including a voice communication system mounted in a resilient member externally of the helmet.
Figure 2:
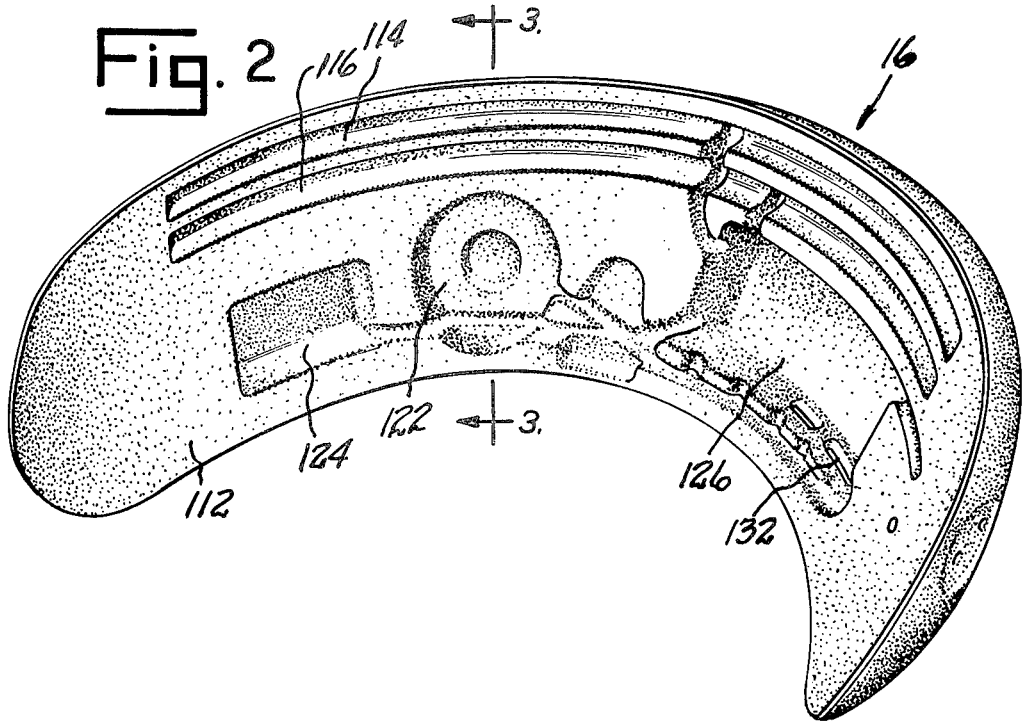
FIG. 2 is an interior perspective view of a resilient member which supports and protects the electronic circuitry of the communication system.

In the embodiment of the invention illustrated in FIGS. 1, 2 and 3, a resilient carrier 16 is provided for the electronic circuit components of the two-way voice communication system of the present invention. Additionally, a microphone 18 is provided and the microphone is secured by a hinged supporting member 20 to a pivotable adjustable anchor member 22 supported by and secured to the helmet body. Where a resilient member 16 for the electronic circuit components is provided and where the resilient member is secured to the outside of the helmet, a suitable opening is provided in the resilient member 16 through which the anchor member 22 may project outwardly from the helmet itself. Electric wires or leads 24 extend from the microphone 18 to a suitable connector and then to the electronic circuitry of the voice communication system.

The aforementioned copending application Ser. No. 720,652, filed Sept. 7, 1976, discloses one type of a two-way voice controlled communication system which can be utilized according to the principles of the present invention. For the purpose of the complete description, but not by way of limitation, FIG. 7 herein provides a brief description of the electronic circuitry and components associated with such a two-way voice controlled communication system. Briefly, the voice communication system includes a circuit having a transmitting portion and a receiving portion. The circuit is designed to be normally in a "listen" or receive mode. The transmitting portion of the circuit is actuated in response to the voice of the wearer of the helmet thereby eliminating the need for a manual switch to put the system in a "talk" or a transmit mode.

Figure 7:
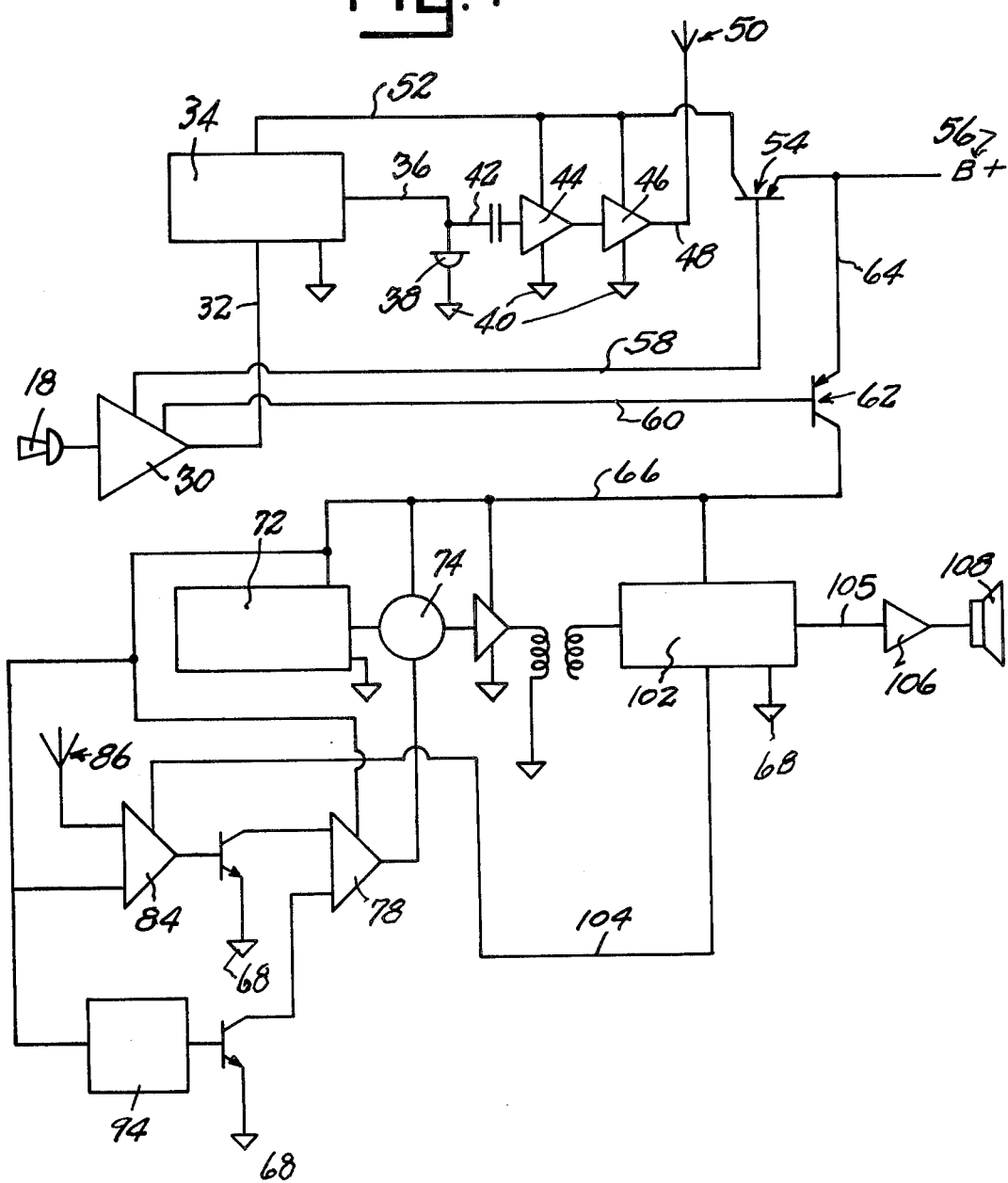
FIG. 7 is a block diagram of a two-way voice controlled communication system of the type which could be used in the present invention.

The transmitting portion of the circuit of FIG. 7 will now be described. Microphone 18 is preferably of the noise cancelling type, i.e., the microphone has both sides of its diaphragm exposed so that planar waves such as ambient noise are cancelled out by their impacting against both sides of the microphone. Sperical waves, such as those occasioned by the microphone diaphragm being close to the mouth of the person speaking, cause the diaphragm to vibrate and thus transmit signals along lead 24. Noise cancelling microphones are, of course, conventional.

The output from the microphone 18 is connected via the lead 24 to a voice responsive amplifier 30 having three outputs. The first output from the voice responsive amplifier 30 is coupled along lead 32 to a local oscillator 34. A first output from the local oscillator 34 is connected by lead 36 to a tunnel diode 38 with the opposite side of the tunnel diode connected to the system ground 40. The output from the local oscillator also passes from lead 36 to lead 42 across a capacitor and to a first amplifier 44 and then a second amplifier 46 connected in series with the first amplifier 44. Each of the amplifiers 44 and 46 are also coupled to the system ground 40. The output from the second amplifier 46 is connected via lead 48 to a transmitting antenna 50.

A second input to the local oscillator 34 is connected by lead 52 from a transistor 54 which transistor is connected to a positive source of potential such as battery 56. The second of the three outputs from the amplifier 30 is connected along lead 58 to the base of transistor 54. The third output 60 from the amplifier 30 is connected via lead 60 to the base of a second transistor 62. Second transistor 62 also is provided with positive voltage from the battery 56 via lead 64. The output of transistor 62 is connected via lead 66 to the signal receiving circuit.

The signal receiving circuit of the present invention will now be explained. The incoming or received communication signal is received by an antenna 86. The signals from the antenna 86 are fed to a preamplifier 84 which also receives an input from the battery 56 through transistor 62 and along lead 66. The battery 56 also provides power to a first oscillator 94 the output of which is fed through a transistor to a first mixer 78. The output of the preamplifier 84 is also connected through a second transistor to the first mixer 78. The output of the first mixer 78 is connected to a second mixer 74.

As is conventional with receivers of this type, a local oscillator 72 is provided and this oscillator also receives power from the battery 56 through transistor 62 and lead 66. The output of the local oscillator 72 is also fed to the second mixer 74.

The output of the second mixer 74 is fed through an amplifier to an FM detector 102 which is also powered by the battery 56. For the purposes of providing automatic gain control, another input to the preamplifier 84 is connected along lead 104 from the FM detector 102. The output of the FM detector 102 is coupled along lead 105 to an audio amplifier 106 and the output of the audio amplifier 106 is connected to a tranducer means or sound reproducing unit 108. The transistors, amplifiers, oscillators and FM detector are all connected to a common ground designated as 68.

As is conventional, ground 68 and ground 40 are one and the same system ground and are at a negative potential relative to the battery 56. Also as is well understood by circuit designers, the relative polarity of the battery and the system ground may be reversed with suitable changing of the biasing of the components and changing from NPN to PNP transistors.

Having thus described the elements comprising the transmitting and receiving portions of the circuit, the operation of the circuit will now be explained. Since the microphone 18 is of the noise cancelling type which does not respond to ambient sound, there is normally no significant output from the amplifier 30 of the transmit circuit and the transmitting circuit is normally not providing an output signal at its antenna 50. Hence the circuit may be normally maintained in the receive or listen mode with the transistor 62 providing power to the receiving portion of the circuit. As long as transistor 62 is conducting, transistor 54 is not conducting and the transmitting section of the circuit is disabled. The in- coming or received signals at the antenna 86 are fed through the receive circuit, as is conventional in voice communication systems, to energize the transistor means 108 and thus provide output signals.

Upon energization of the microphone 18 by the voice of the user of the system, the amplifier 30 is activated. This provides a signal along lead 60 to the base of transistor 62 to turn off the transistor 62, i.e., render transistor 62 non-conducting and the output from amplifier 30 along lead 58 to the base of transistor 54 turns transistor 54 on so that it is conducting.

To accomplish this, the amplifier 30, as fabricated by the manufacturer also includes a flip flop providing the signals on lead 58 and 60 to turn on and off the respective transistors 54 and 62.

Further specific details of the circuitry are given in the aforementioned copending application 720,562. However, with respect to the present invention, is believed sufficient to indicate that amplifier circuit 30 includes two voltage comparators receiving their input from within the amplifier 30. The first comparator changes the state of an internal flip flop which controls the transmitter and receiver circuits. The second comparator, which is set at a high value, provides the signal for the gain control amplifier for the system input. Both comparators have slow rates and are controlled such that the activation of the transmitter is not momentary but lasts for a selected time interval. This prevents triggering on the transmitting circuit by a single sharp impulse or noise. Both of the local oscillators are crystal controlled to permit operation of the unit within an assigned frequency range as designated by the Federal Communications Commission.

Having thus described the circuitry and its operation briefly, we turn now to the transducer means of the present invention. The transducer means 108 is shown schematically in the circuit diagram of FIG. 7 as a speaker. In accordance with the principles of the present invention, the transducer means is designed to vibrate in response to the signal from the audio amplifier 106 and thus vibrate a rigid portion of the protective helmet 10. In one embodiment, the transducer means 108 may be a piezoelectric element having a portion thereof 110 in contact with the rigid portion of the helmet. The output signals from the audio amplifier 106 to the piezoelectric element will cause the piezoelectric element to vibrate and the portion 110 thereof in contact with the helmet 10 will in turn cause the helmet to vibrate.

As another embodiment, the transducer means 108 may be an electromechanical element such as a conventional radio speaker with the cone removed so that the magnet and support structure remain. In such case, the magnet will vibrate in response to the signals from the audio amplifier 106. A connecting member 110, such as a plastic or metal stud, in contact with both the magnet and the helmet 110 will vibrate when the magnet vibrates to thereby cause vibration of the helmet 110.

Thus, with respect to the transducer means 108, vibration is caused in response to the received signal from the audio amplifier 106 which causes the helmet to vibrate and function as the diaphragm of a conventional speaker. Thus any received signals are readily heard and distinguished by the wearer of the helmet.

Referring now to FIGS. 2 and 3, the resilient member 16 will be explained. This resilient member may be secured to the exterior of the helmet, as shown in FIG. 1, by any suitable manner such as by an adhesive and would be of arcuate configuration to conform to the configuration of the helmet. The inner concave face 112 of the flexible member 16 is secured or adhered in face-to-face contact with the outer surface of the helmet.

The resilient member 16 may be formed of a sponge rubber or flexible urethane or the like having a continuous outer skin or surface portion and having a closed cellular construction to provide a water proofing function. Alternatively, the resilient member 16 may be formed of soft solid rubber, synthetic rubber or plastic water proofing material as long as there is sufficient resilience to yield and absorb impact to protect the electronic circuit components.

In one embodiment the inner face 112 of the resilient member 16 is characterized by a plurality of cavities in which specific portions of the circuit may be conveniently supported.

For example, a pair of elongated cavities 114 and 116 may be provided to receive wire coils 118 and 120 which form the transmitting antenna 50 and receiving antenna 86, respectively. A third cavity 122 in the inner face of the resilient member 16 receives the transducer means 108 and another cavity 124 may be provided to receive the battery 56 which in the preferred embodiment is a replaceable dry cell.

The various electronic components of the transmitting and receiving circuits may include a plurality of encapsulated parts and one or more printed circuit board members, these all being sufficiently compact to fit within a cavity 126 provided in the resilient member 16. Suitable grooves may also be provided in the face of the resilient member 16 interconnecting the cavities therebetween to accommodate the required electrical connections.

Thus the resilient member 16 serves to support the electronic components and circuitry and protect them against damage by absorbing impact and vibration when the helmet is impacted.

By utilizing a voice controlled or voice actuated transmitting circuit, there is no longer the need for external manual switching to control the transmitting and receiving circuits. In other words, there is no need for a "press-to-talk" type of control. Thus the hands of the user of the helmet are free at all times for the performance of the intended tasks. Obviously, the water proof nature of the resilient member 16 and its mounting to the exterior of the helmet by adhesion ensures against penetration of moisture thus avoiding damage of the electronic components. The components, of course, may also be provided with a moisture resistant coating.

With respect to FIGS. 4, 5 and 6, other features of the invention will now be explained. FIG. 4 illustrates, for diagrammatic purposes, a helmet 200 of the type typically worn by fire fighters having a plastic rigid crown or body portion with a marginal outwardly projecting rim 202. The crown or upper portion of the helmet is provided with an upwardly projecting central rib portion 204.

When a helmet such as illustrated in FIG. 4 is utilized, or, alternatively, when a helmet of the type typically used by construction workers, factory workers and the like is utilized, the resilient member 16 and the electronics may be positioned interiorly of the helmet. By way of example, and not by way of imitation, the resilient carrier 206 of FIG. 5 may be provided and configured of such a size and shape to fit within the rib portion 204. The carrier 206 may also be provided with a plurality of cavities to support the electronic circuit component as heretofore described. FIG. 6 shows such a resilient member 206 supporting the electrical components interiorly of a protective helmet.

Based upon the foregoing, it should be appreciated that the resilient member which supports and protects the electronic circuitry may be positioned interiorly or exteriorly of the protective helmet. When the resilient member is interiorly of the helmet, the resilient member also serves to cushion the head of the wearer much in the same way as the conventional protective lining 12 provides such a function.

In fact, when the resilient member is intended to be positioned interiorly of the helmet, the function of the resilient member may be served by the interior lining 12 itself as long as sufficient space is provided to receive the electrical components. Thus when the electrical components are positioned interiorly of the helmet, the term resilient member describes the function performed by the liner 12, or by the additional resilient member 16 or 206, or by the combination thereof, whichever is utilized in the particular helmet. What is important is the function provided by such element, namely, that it supports the electronic components in proper position and provides a shock absorbing impact absorbing cushioning means.

The electronic circuitry also includes, as is conventional, an on/off switch. Such a switch may be mounted in a cavity in the resilient member and project therefrom for manual operation. When the electronics are positioned exteriorly of the helmet, as in FIG. 1, a switch actuator 130 may extend through a suitable opening 132 in the carrier (or alternatively in the protective liner 12) to be readily accessible for manual actuation.

The electronics may be positioned interiorly of the helmet at the top thereof, such as in FIG. 4, at the front thereof or at the rear thereof. When positioned at the top of the protective helmet, as illustrated generally in FIG. 4, a switch actuator 134 may extend through a suitable opening 136 in the helmet to be easily accessible.

What is important, when the electronic circuitry is positioned interiorly of the helmet, is that the circuitry is supported by and protected by a resilient cushioning member, either by the lining 12 of the helmet or by an auxiliary member 16 or 206 as distinguished from prior art devices where the electronics are positioned rigidly inside the helmet or secured to the helmet itself.

The foregoing is a complete description of the present invention. Many changes and modifications may be made without departing from the spirit and scope of the invention. The invention, therefore, should be limited only by the scope of the following claims.

What is claimed is:

1. In a protective helmet of the type including a voice communication system for selectively operating in transmitting and receiving modes, the improvement comprising:

said protective helmet including a rigid portion capable of vibration in the audio frequency range;

an audio signal transducer including a vibratable drive member, actuable in response to a received signal; and, said drive member being positioned relative to said helmet to drivingly contact said rigid portion whereby said rigid portion functions as a diaphragm of the transducer to produce signals in the audio frequency range.

2. A structure as in claim 1 further including a voice-controlled electronic switch means for selectively controlling the system to operate in transmitting and receiving modes.

3. A structure as in claim 1 wherein said vibratable element comprises a piezoelectric element receiving signals from said communication system and in contact with said helmet rigid portion for vibrating the same.

4. A structure as in claim 1 wherein said vibratable element comprises an electromechanical element receiving signals from said voice communication system and in contact with said helmet rigid body portion for vibrating the same.

5. A structure as in claim 1 further including a resilient member secured to the outside of said protective helmet;

said communication system including a transmitting and receiving circuit, and said recieving circuit supported by said resilient member and cushioned by said resilient member against damage from impact and the like.

6. A structure as in claim 1 wherein said voice communication system includes a first antenna for said transmitting circuit and a second antenna for said receiving circuit, each of said antennae supported by and cushioned by said resilient member.

* * * * *